No. 747,813. PATENTED DEC. 22, 1903.
A. E. WATSON.
SCRAPER FOR WHEELS OF AGRICULTURAL IMPLEMENTS.
APPLICATION FILED JULY 13, 1903.
NO MODEL.
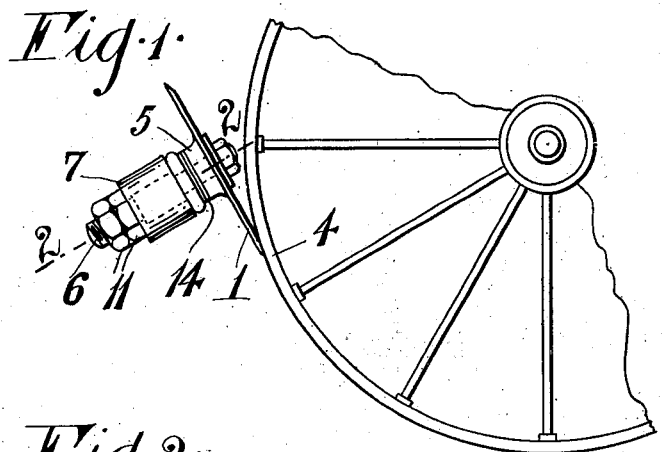
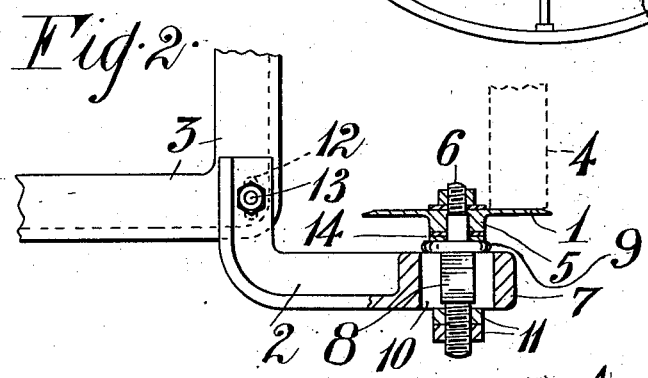
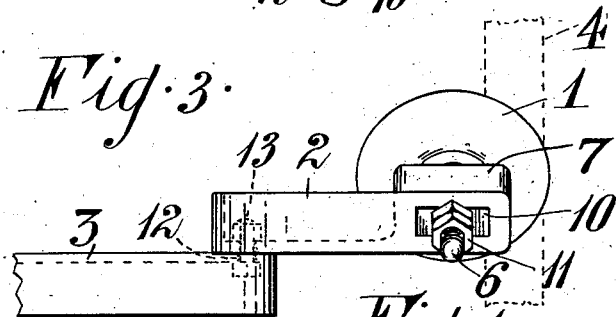
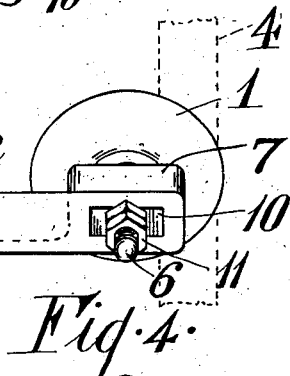
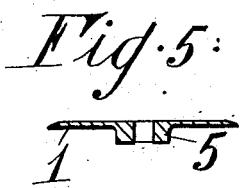
Witnesses
William H. Waters.
Walter C. Hart.
Inventor
Anthony Edwin Watson
by
Edw. Waters & Son
Attorneys No. 747,813.

Patented December 22, 1903.

UNITED STATES PATENT OFFICE.

ANTHONY EDWIN WATSON, OF KYNETON, VICTORIA, AUSTRALIA.

SCRAPER FOR WHEELS OF AGRICULTURAL IMPLEMENTS.

SPECIFICATION forming part of Letters Patent No. 747,813, dated December 22, 1903.

Application filed July 13, 1903. Serial No. 165,321. (No model.)

*To all whom it may concern:*

Be it known that I, ANTHONY EDWIN WATSON, farmer, a subject of the King of Great Britain, residing in Begg street, Kyneton, in the State of Victoria and Commonwealth of Australia, have invented an Improved Scraper for Wheels of Agricultural Implements, of which the following is a specification.

This invention relates to means for cleaning off the dirt or soil that collects on the wheels of agricultural implements, and it may be attached to any such implement by any suitable bracket.

Figure 1 is an end elevation of the scraper. Fig. 2 is a horizontal section on line 2 2 of Fig. 1, while Fig. 3 is a rear elevation of Fig. 1. Figs. 4 and 5 are detached detail views of part of this invention.

Referring to the drawings, it will be seen that my scraper consists, essentially, of a disk 1, revolubly mounted upon one end of a bracket or arm 2, bent to any suitable shape and springing from the frame 3 of, say, a seed-drill, said disk or bracket being capable of adjustment in order that it may be brought up against the periphery of the wheel 4. The disk may be flat or concavo-convex, and the friction against the implement-wheel tends to keep it comparatively sharp and runs free— that is to say, is not driven by gearing or the like, but, on the contrary, is driven by frictional contact with the implement-wheel. The disk, which is set at any desirable angle to the periphery of the wheel, has a central boss 5 and is mounted on one end of a spindle 6, rigidly secured in a boss 7 on the end of the bracket 2, said spindle 6 being at the side of the wheel. This spindle 6 is squared, as at 8, about its center and is threaded at each end and provided with a shoulder 9, as clearly illustrated in Fig. 4. The squared part 8 of the spindle fits into a slot 10 in the boss 7 of the bracket, so that the disk may be adjusted with relation to the wheel and held rigidly in position by tightening the nuts 11. The disk is secured in position on the bracket about the height of the axle of the implement-wheel, as shown. The frame 3 of the implement has a slot 12, in which the bolt 13, which secures the bracket to the frame, may be moved, so that the disk can be adjusted with relation to its contiguity to the periphery of the wheel. The disk may be also adjusted by placing washers 14 between the boss of said disk and the shoulder 9 of the spindle.

As the wheel of the implement revolves the disk is also rotated by the friction against the periphery of said wheel, which is thereby effectively freed from the clinging dirt and soil and thoroughly scraped.

It must be understood that I do not confine myself to the shape of the bracket shown, as it must naturally conform itself with regard to position and height of the frame of the implement to which the invention is attached.

Having now particularly described and ascertained the nature of my said invention and in what manner the same is to be performed, I declare that what I claim is—

1. An improved scraper for wheels of agricultural implements, consisting of a freely-rotatable disk revolubly mounted in proximity to the periphery of the implement-wheel and at a right angle thereto, said disk being arranged to be rotated by frictional contact with the implement-wheel substantially as set forth and illustrated.

2. An improved scraper for wheels of agricultural implements, consisting of a freely-rotatable disk adjustably mounted at a right angle to the implement-wheel on a spindle at one side of the periphery of said implement-wheel, said spindle being carried by an adjustable bracket fitted to the implement-frame, the said disk being rotated by frictional contact with the implement-wheel, substantially as set forth and illustrated.

3. An improved scraper for wheels of agricultural implements, consisting in a disk revolubly mounted upon the end of a spindle, having a shoulder and a squared part about its center adjustably fitting into a slot in a boss on a bracket or arm adjustably secured to the frame of the implement, substantially as set forth and illustrated.

In testimony whereof I have hereunto set my hand in presence of two subscribing witnesses.

ANTHONY EDWIN WATSON.

Witnesses:
 EDWARD WATERS,
 EDWARD WATERS, Jr.